Figure 9:
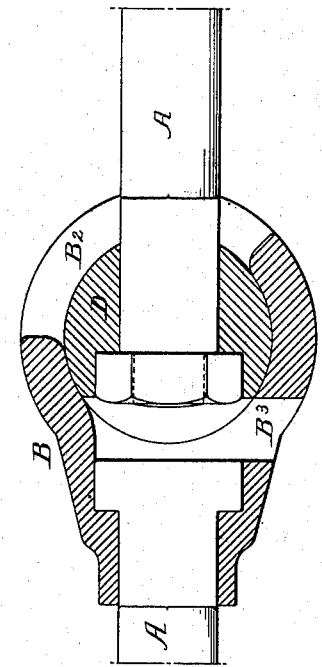

(No Model.) 3 Sheets—Sheet 1.
J. M. DODGE.
CHAIN FOR CONVEYERS, &c.
No. 565,844. Patented Aug. 11, 1896.
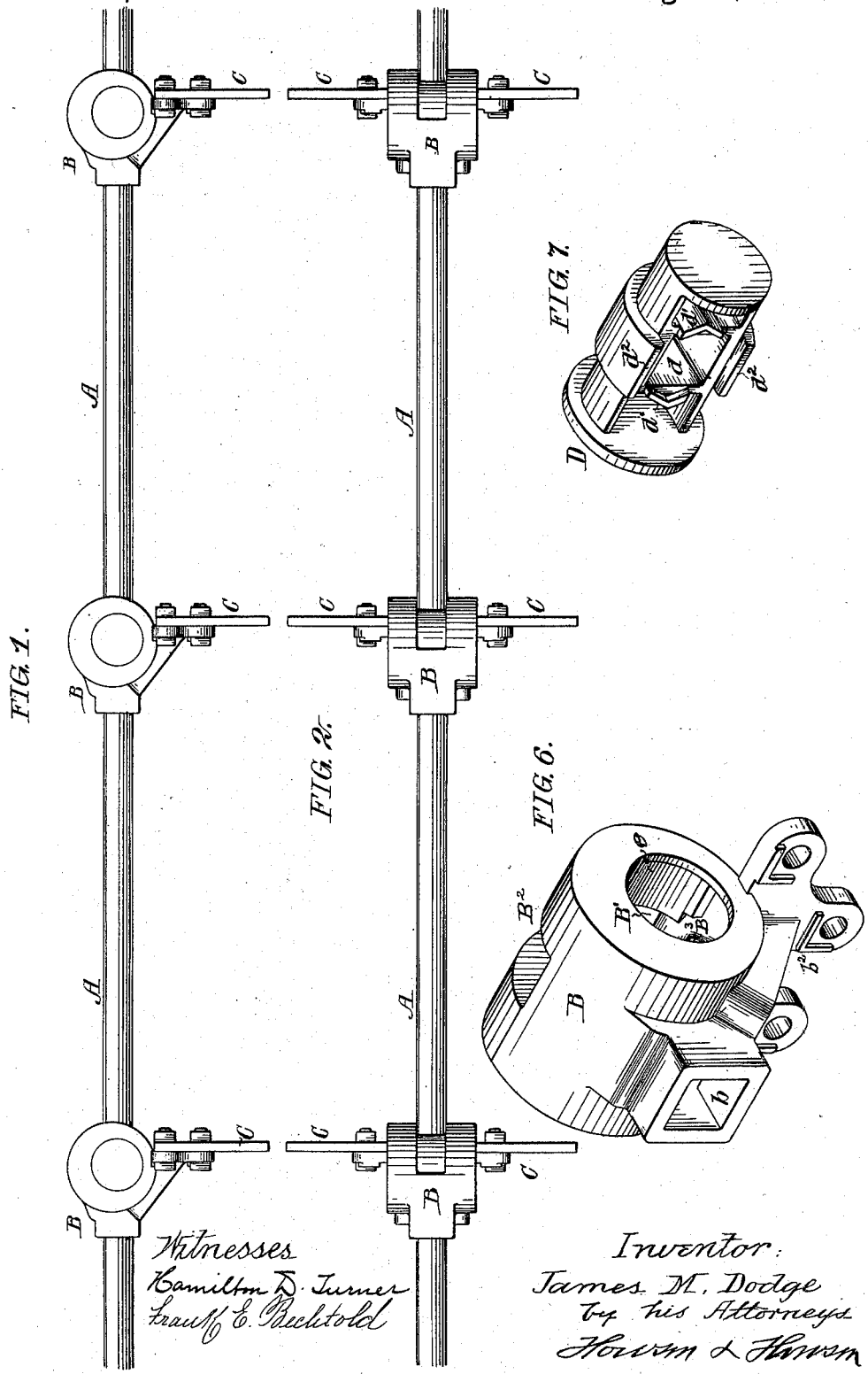

(No Model.) 3 Sheets—Sheet 2.
J. M. DODGE.
CHAIN FOR CONVEYERS, &c.
No. 565,844. Patented Aug. 11, 1896.
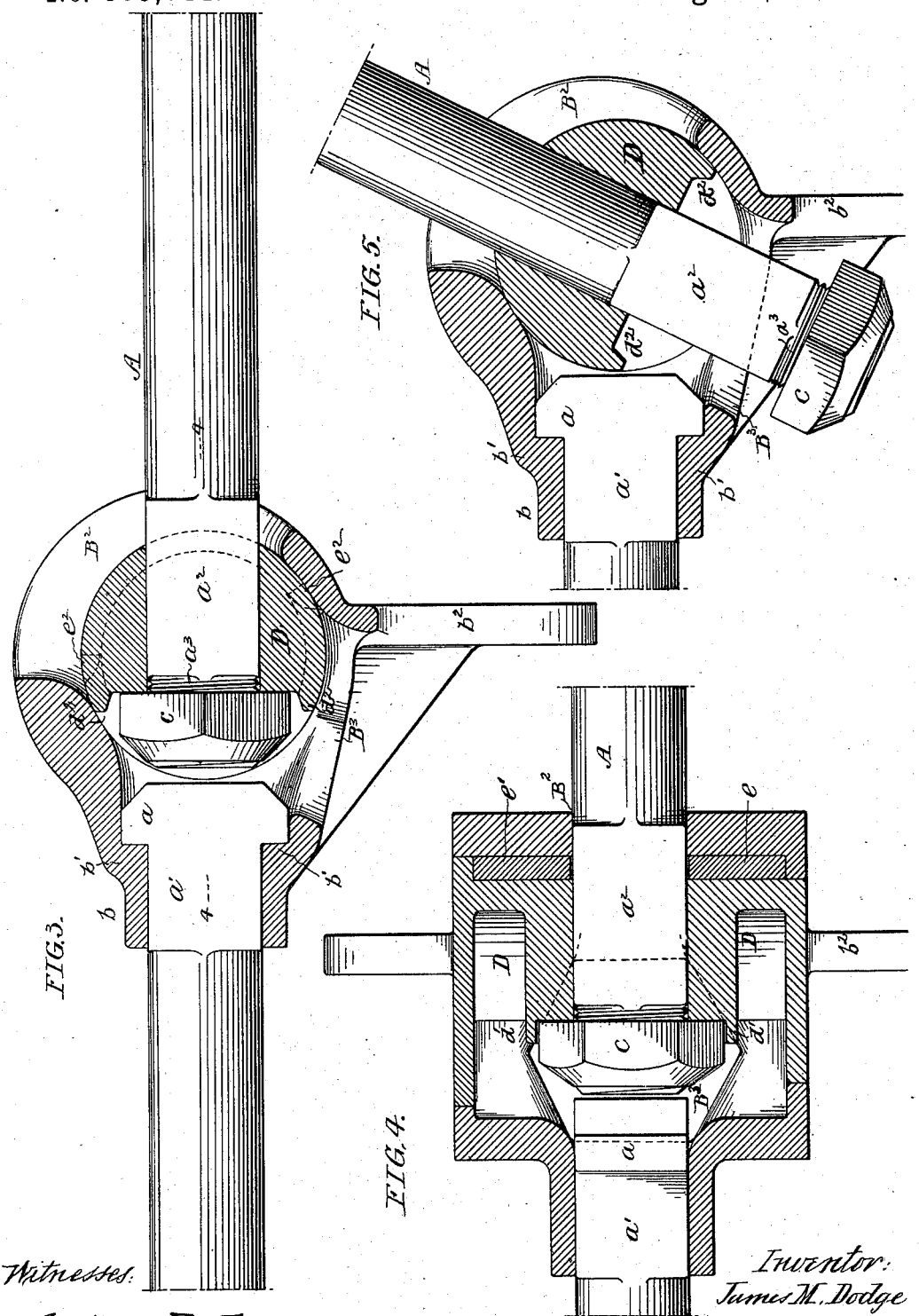
Witnesses:
Hamilton D. Turner
Frank E. Bechtold
Inventor:
James M. Dodge
by his Attorneys
Howson & Howson (No Model.) 3 Sheets—Sheet 3.

J. M. DODGE.
CHAIN FOR CONVEYERS, &c.

No. 565,844. Patented Aug. 11, 1896.

Witnesses:
Hamilton D. Turner
Frank E. Bechtold

Inventor:
James M. Dodge
by his Attorneys
Howson & Howson

UNITED STATES PATENT OFFICE.

JAMES M. DODGE, OF PHILADELPHIA, PENNSYLVANIA.

CHAIN FOR CONVEYERS, &c.

SPECIFICATION forming part of Letters Patent No. 565,844, dated August 11, 1896.

Application filed January 17, 1895. Serial No. 535,262. (No model.)

*To all whom it may concern:*

Be it known that I, JAMES M. DODGE, a citizen of the United States, residing in Philadelphia, Pennsylvania, have invented certain Improvements in Chains for Conveyers, &c., of which the following is a specification.

The object of my invention is the construction of a chain for conveyers or other purposes of a series of rods hinged together so as to allow of free articulation of the rods in one direction and to permit easy and economical detachment and replacement of the parts.

In the accompanying drawings, Figure 1 is a side view of a section of a conveyer embodying my invention; Fig. 2, a plan view; Fig. 3, a longitudinal view, partly in section, showing the manner in which the rods are hinged together. Fig. 4 is a sectional plan view on the line 4 4, Fig. 3. Fig. 5 is a view showing one method of connecting or attaching the parts of the device. Fig. 6 is a perspective view of a socket constituting one of the elements of the hinged joint. Fig. 7 is a perspective view of a bearing-block constituting the other element of said hinged joint, and Figs. 8, 9, 10, and 11 are views of modifications of my invention.

A A are rods, each carrying at one end a socket B and at the other end a bearing-block D, the longitudinal axis of the block being parallel with the longitudinal axis of the socket, and the bearing-block of one rod and the socket of another rod being adapted to and coöperating with each other, as hereinafter described, when the parts are assembled into a chain.

C, Figs. 1 and 2 are conveyer-flights, secured to lugs $b^2$ on sockets B, as shown.

The socket B, preferably of the shape shown in Figs. 3, 4, and 6, is a closed socket, *i. e.*, not in the form of an open hook, and has in one side an elongated slot $B^2$ and in the opposite side, in line with said slot $B^2$, an aperture $b$.

That end of rod A which carries said socket has a squared end portion $a'$ and a head $a$, the relative shape and dimensions of slot $B^2$ of the socket and head $a$ of the rod being such that the rod and its head can be passed through said slot, the rod being also passed through the aperture $b$ of the socket until the head $a$ of the rod comes to a bearing against shoulders $b'$ of the socket.

The socket B has a cylindrical chamber $B'$, within which is received and works a cylindrical bearing-block D, and in the under side of socket B is an aperture $b^3$, for a purpose hereinafter indicated.

Bearing-block D has a transverse square opening $d$, through which that end of one of the rods which carries said block, when the parts are assembled into a chain, can be passed, and within which the squared end portion $a^2$ of said rod snugly fits. The end of rod A, carrying said bearing-block, has a screw-thread $a^3$ for the reception of threaded nut $c$, serving to detachably secure the bearing-block upon the rod. The parts described are thus assembled to form a chain.

A rod A is passed through slots $B^2$ and aperture $b$ of socket B until its head $a$ comes to a bearing against the shoulders $b'$ within the socket, as shown in Fig. 3. A cylindrical bearing-block D is then slid laterally into the chamber $B'$ of said socket, which chamber is for this purpose made open at one or both ends, and is brought into the position shown in Fig. 5. Another rod A is then passed through slot $B^2$ of the socket and through apertures $d$ of the bearing-block, so that its screw-threaded end shall project through aperture $B^3$ in the under side of the socket far enough to allow nut $c$ to be secured upon said screw-threaded end. Rod A is then retracted until nut $c$ comes to a bearing against a flattened portion of the bearing-block D and between lugs $d'$ $d^2$, formed upon the said bearing-block, and which serve to prevent the nut from turning.

When the parts have been thus connected and brought into the position illustrated in Fig. 3, which is that which they will occupy when in use in a chain under tension, the rods are securely coupled by a hinge-joint, allowing articulation of the rods in one direcrion only, since the longitudinal axis of the bearing-block D is at right angles to that of the rods, and said bearing-block is free to work within the cylindrical chamber $B'$ of its socket B, and the rod A, carrying said bearing-block, has the necessary play within slot $B^2$ of said socket.

I prefer to arrange bearing-plates $e$ $e'$ between the socket and the bearing-block D to take the wear of the parts, so that these plates may be removed and replaced when worn. This, however, is not essential.

The bearing-plate $e$ is mounted in the socket between lugs, which prevent it from turning with the block, while the bearing-plate $e'$ I prefer to make loose, so as to be removable with the bearing-block D from the socket, said bearing-plate $e'$, when mounted in the socket, being prevented from turning by projections $e^2$. Shown in dotted lines in Fig. 3.)

To uncouple the rods, it is only necessary to bring the parts into the position shown in Fig. 5, unscrew the nut $c$ from the rod A, carrying it, when said rod can be readily withdrawn from the bearing-block and socket and the bearing-block slid out of the socket, after which the rod A, carrying the socket, is free to be passed through the slot $B^2$ of the latter.

A chain constructed in accordance with my invention, while useful for a variety of purposes, is especially applicable in the construction of conveyers. A conveyer so constructed can be readily taken apart and reassembled for purpose of repair or alterations, and if breakage occurs it will be of the rods rather than of the sockets, making repair simple and easy.

I wish it understood that I do not confine myself to the precise details of construction and arrangement hereinabove set forth, as these may be to some extent varied or departed from without departing from the spirit of my invention. For example, in the modification shown in Fig. 8 of the drawings, the head of the bolt is confined within the bearing-block and the nut is secured to the opposite end of the bolt. In this instance the bolt is first passed through the opening in the socket and in the bearing-block until the head comes to its seat in the bearing-block. Then the nut is passed up into the opening of the adjoining socket and the rod passed through the opening $b$ therein, and the nut is then screwed upon the rod, as clearly shown in said figure.

In Fig. 9 the aperture $B^3$ in the lower part of the socket is made large enough only to allow of the nut $c$ being passed up through said aperture and screwed onto the end of the rod A without projecting the rod through the opening, as shown in Fig. 5.

Figure 10:
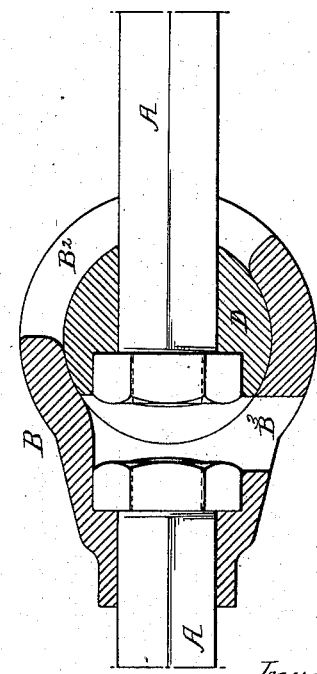

In Fig. 10 I have shown the rod screw-threaded at both ends and adapted to nuts passed up through the opening $B^3$ in the socket, one nut screwed onto one rod and the other nut screwed onto the adjoining rod. The rods in this instance are shown as square, but they may be oval or otherwise shaped so as to prevent them turning in their sockets or bearing-blocks.

Figure 11:
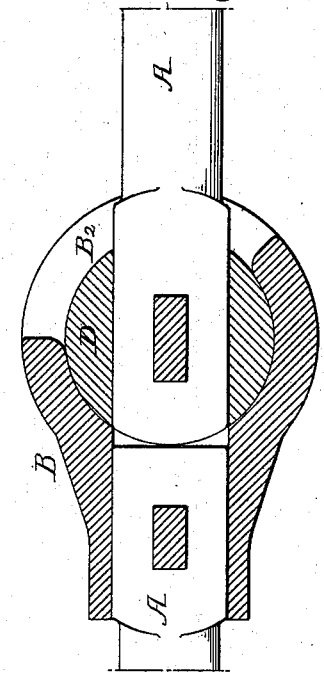
Figure 8:
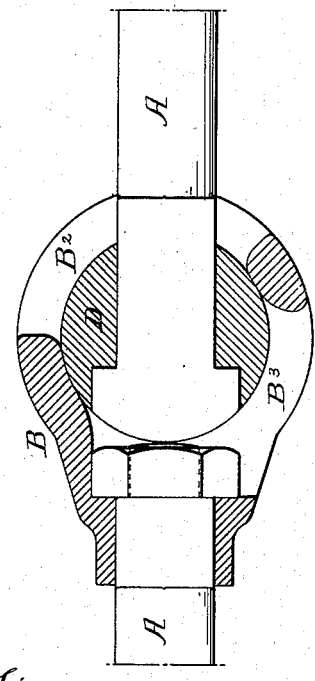

In Fig. 11 I have shown the rods secured to the bearing-block and to the socket by keys.

It will be understood that in some instances a key may be used in the other modifications in place of the head or nut, and that the threaded rods, for instance, as shown in Fig. 10, may be screwed into orifices in the socket and bearing-block without departing from my invention.

I claim as my invention—

1. A chain-link or unit composed of a rod carrying at one end a closed socket having a circumferential slot and a cylindrical chamber adapted to receive a bearing-block of an adjoining section, and carrying at the other end a cylindrical bearing-block adapted to snugly fit a socket of an adjoining section, the longitudinal axis of the bearing-block being parallel with the longitudinal axis of the socket and at right angles to the longitudinal axis of the rod, the bearing-block being removable from the rod, substantially as set forth.

2. A chain-link or unit composed of a rod carrying at one end a closed socket having a circumferential slot and a cylindrical chamber, and at the other end a cylindrical bearing-block, both bearing-block and socket being connected to the rod detachably, but so as to be rigid thereon when the parts are assembled, and the longitudinal axis of said bearing-block and of the cylindrical chamber in said socket being parallel with each other, and at right angles to the longitudinal axis of the rod, all substantially as herein set forth.

3. The combination of a cylindrical bearing-block, a closed socket having a transverse cylindrical chamber therein adapted to receive the bearing-block, and having a circumferential slot in one side, a rod secured to the block and passing through the circumferential slot in the socket and a rod secured to the socket and extending in a direction opposite to that of the rod attached to the block, substantially as described.

4. A socket B having a cylindrical chamber $B'$ adapted to the reception of a cylindrical bearing-block, said socket also having a slot $B^2$, an aperture $b$, and an aperture $B^3$, all substantially as set forth.

5. In a conveyer-section, the combination with a bearing-block, and a rod, of a closed socket for the block made in a single piece, having a circumferential slot in one side and an opening in the opposite side in line with said slot, the rod of the bearing-block being adapted to be passed through said slot and opening, substantially as described.

6. The combination of a socket B having a slot $B^2$ and an aperture $B^3$, a bearing-block adapted to said socket, a rod also adapted to the socket, another rod adapted to the bearing-block, the aperture $B^3$ in the socket allowing for the passage of the head of the rod carried by the bearing-block when the parts are to be uncoupled, substantially as described.

7. The combination of two rods, a closed socket secured to one of said rods, a bearing-block secured to the other rod, said socket having a circumferential slot for the rod of the block to work in, and an aperture for the passage of the said bearing-block rod, and a nut adapted to the rod, the aperture being of sufficient diameter to allow for the passage of the nut to the bearing-block so that the bearing-block can be turned into working position, substantially as described.

8. The combination of a closed socket made in a single piece, having a circumferential slot, an opening opposite the slot and a chamber, a bearing-block adapted to said chamber, a headed rod adapted to the opening in the socket, a rod extending through the slot in the socket and into the bearing-block, and a nut on said rod at the rear of the block, the socket having an aperture for the withdrawal of the nut, substantially as described.

9. The combination of a slotted socket B, a rod attached thereto, a bearing-block D within the socket, a rod secured to the bearing-block and passing through the slot therein, lugs $e^2$ on the inside of the socket, detachable segmental wearing-plates $e$ $e'$ mounted between the lugs on each side of the slot and held in place by the bearing-block, the plate $e'$ being removable with the socket, substantially as described.

In testimony whereof I have signed my name to this specification in the presence of two subscribing witnesses.

JAMES M. DODGE.

Witnesses:
WILL A. BARR,
JOSEPH H. KLEIN.